W. F. WATERS.
Tire Setter.

No. 103,531.  Patented May 24, 1870.

United States Patent Office.

WILBUR F. WATERS, OF DUNKIRK, NEW YORK.

Letters Patent No. 103,531, dated May 24, 1870.

IMPROVEMENT IN MACHINES FOR PUTTING TOGETHER AND TIRING WHEELS.

The Schedule referred to in these Letters Patent and making part of the same.

I, WILBUR F. WATERS, of Dunkirk, in the State of New York, have invented a "Machine for Putting Together and Tiring Wheels," of which the following is a specification.

My invention consists in the construction of a table, having a form cast thereon to fit the inside of the rim of the wheel, and with adjustable blocks arranged around the outside, by which the rim is pressed upon the spokes, and the tire pressed close upon the rim, and there held in shape against the form, during the process of riveting the tire.

A steam-heating trough is arranged beneath the table for keeping the tire expanded during the process.

To enable others skilled in the art to make and use my invention, I will now proceed to describe its construction and operation.

Figure 1:
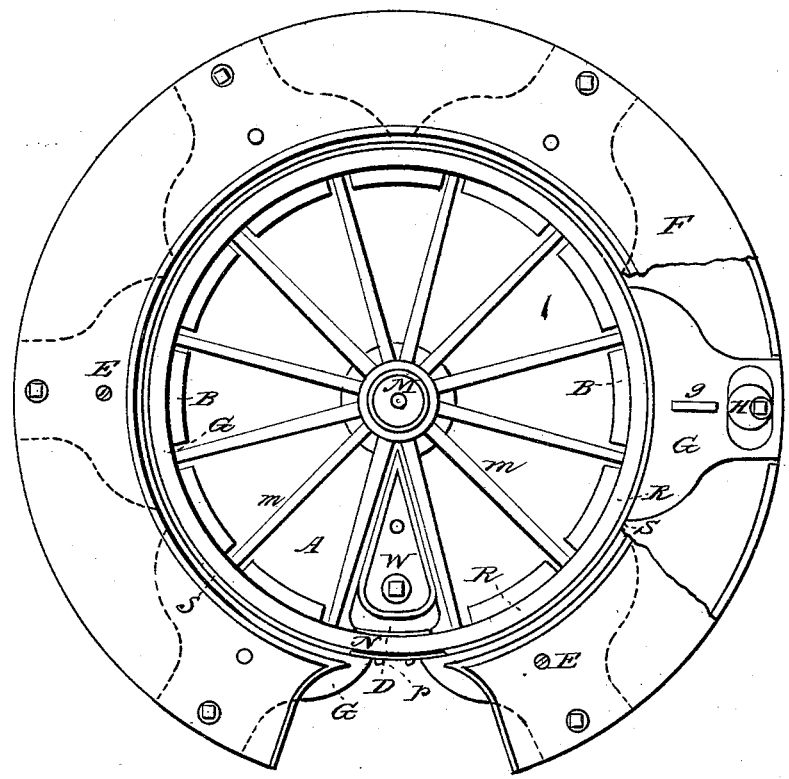
Figure 2:
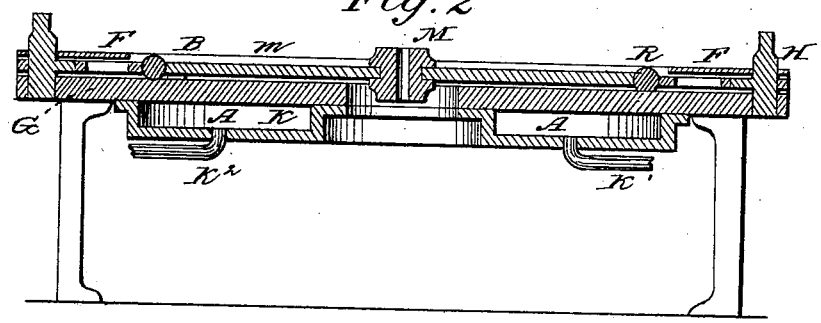

Figure 1 is a plan of the machine.
Figure 2 is a cross-section.

A is the horizontal cast-iron table, upon which is cast the notched ring B, just the size of the inside of the rim of the wheel.

One segment of this ring is omitted, and a sliding block, D, substituted in its place.

This block, which is covered with a cap, W, is forced by a cam or wedge against the inside of the rim upon the rivet heads during the process of riveting.

Around the edge of the table a cap F is bolted by the bolts E, leaving a space between for the sliding blocks G.

A slot, $g$, in the block, through which the bolts pass, serves as a guide for the motion of the block.

A cam, H, is employed to force the block up against the tire. A screw or wedge might also be used for the same purpose.

Beneath the table is a steam-chest, K, circular in form, and corresponding to the diameter of the tire, either cast on or bolted steam-tight to the table.

$K^1$ is an inlet for steam.

$K^2$, an outlet for the same.

The application of furnace-heat beneath the table is not new, being embodied in previous inventions. By my improvement, however, the heat is directed to the spot where it is needed. It is maintained with great regularity, with very little attention, and the construction is much simplified.

The wheel is now put together in this way:

The spokes $m$ are inserted into the hub M, and laid upon the table A. The rim R, which is in one piece, of circular section, as shown in fig. 2, is next placed on the table in position. The tire S, which has first been grooved in rollers to fit the rim and punched at one end for rivets, is now placed over it, and becomes expanded by the heat of the table.

The blocks G are now set up against the tire, which is pressed in close contact against the rim, and both together are forced against the spokes and the ring B, which gives a uniform shape and size to the wheels.

A short iron plate, N, is placed inside the rim, across the joint. Holes are then drilled through the tire and rim, the rivets $p$ put through from the inside; the block D is keyed fast against the rivet-heads, and the operator completes the riveting.

With this form of rim and tire, a greater strength, for the same amount of material and weight, is obtained than with the ordinary flat or half-round tire.

This peculiar shape of tire requires to be heated while it is being riveted in its place, as it cannot be first heated and welded or riveted and then shrunk on as ordinary tires.

The wheel is now completed, forming a durable piece of workmanship, very symmetrical in design.

What I claim as my invention, and desire to secure by Letters Patent, is—

1. The combination of the inside ring B, notched to fit the spokes, with the outside clamping-blocks G, operating in the manner and for the purpose herein described.

2. The combination of the inside ring B, notched to fit the spokes, with the outside clamping-blocks G, with the rivet-holding block D, arranged and operating as herein described.

3. The steam-chamber K, arranged beneath the table A, in the manner and for the purpose herein described.

W. F. WATERS.

Witnesses:
WM. BOOKSTAM,
JAMES KANE.